Sept. 18, 1928.  T. F. EASTMAN  1,684,821
VIEW FINDER FOR CAMERAS
Filed Dec. 23, 1925
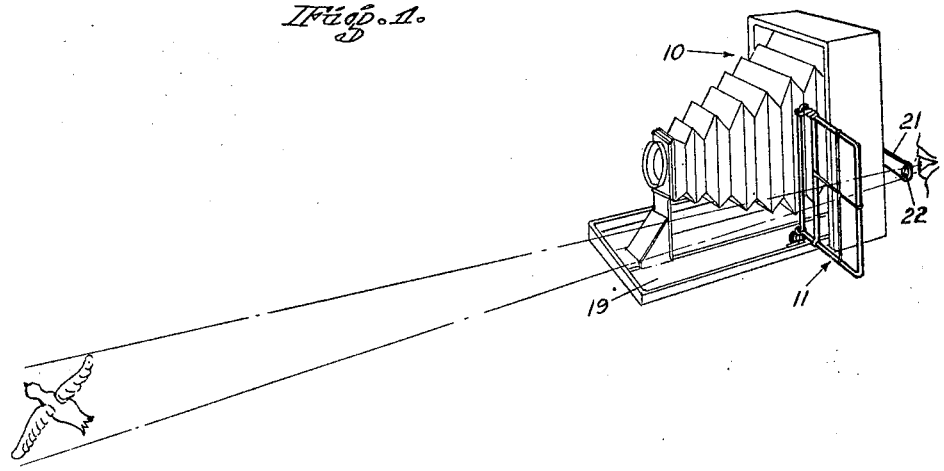
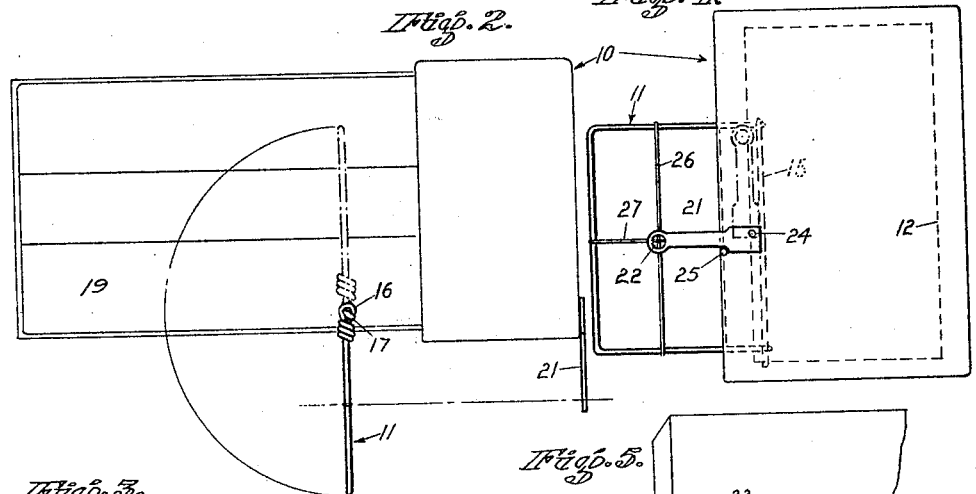
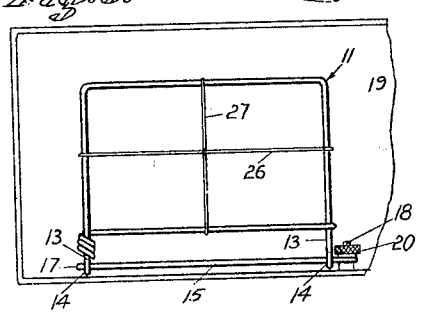
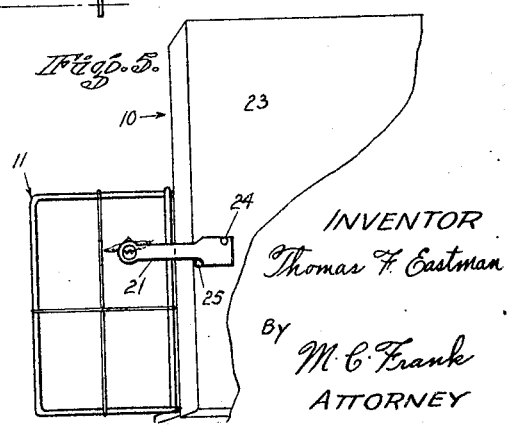
INVENTOR
Thomas F. Eastman
BY
M. C. Frank
ATTORNEY Patented Sept. 18, 1928.

1,684,821

UNITED STATES PATENT OFFICE.

THOMAS F. EASTMAN, OF BERKELEY, CALIFORNIA.

VIEW FINDER FOR CAMERAS.

Application filed December 23, 1925. Serial No. 77,343.

My invention relates to view finders for cameras, and it has special reference to a device by which the image of the object to be photographed is determined upon the exposure surface of the sensitized film or plate by a direct sighting on the object through the view finder.

In view finders provided with a lens for locating the image upon the exposure surface of the film or plate of the camera, the picture as seen through the lens is usually so condensed that it is difficult to distinguish the outlines thereof, and consequently also difficult to locate the picture in the desired place on the film or plate with any degree of precision.

The principal object of this invention is to provide a view-finding device in which the object or field of view can be directly located or composed within a frame of such proportions as to enable an operator to readily determine with precision the contemplated picture in the desired place on the film or plate.

Another object of my invention is to pivotally secure a view finder comprising an open frame in a folding camera, so that the view finder may be housed at the front of and within the camera when the camera is closed, and can be swung to a plane at a right angle to the axis of the camera when the camera is open, and to movably secure a sight member to the camera back of the frame so that the sight member may be moved to a position where a line drawn through the center of the sight opening in the member and the center of the frame opening is parallel with the axis of the camera, thus enabling an operator to quickly determine the location of the image of the view in any desired place on the sensitized film or plate.

Further objects and advantages of the invention will be understood from the following detailed description and from the accompanying sheet of drawings, in which:

Figure 1 is a perspective view of a folding camera, to which my invention is applied, and shows how a bird at a distance from the camera is directly sighted through the view-finder frame by the eye of an operator. The dot-and-dash sight lines indicate the points at which they cross the plane of the frame to show that the image of the bird will appear approximately in the center of the exposure surface of the film or plate of the camera.

Fig. 2 is an outline plan of a camera with my invention applied thereto, and shows the finder frame in a vertical position and in full lines as swung to the service position in a plane at a right angle to the axis of the camera, and the sight member also as moved to the sighting position. The parallel dot-and-dash lines indicate the initial position of the finder frame before being swung to its rest position within the camera; and the single straight dot-and-dash line through the frame and the sight member indicates the parallelism of the central sight line with the axis of the camera.

Fig. 3 is a partial plan of Fig. 2, and shows the finder frame swung down flat upon the inside of the front cover of the camera, the rest position.

Fig. 4 is a rear elevation of the camera and shows the finder frame swung to the view-finding position and the sight member swung to the sighting position; and Fig. 5 is a broken rear view of the camera and shows the finder frame and the sight member in the positions illustrated in Figs. 1, 2 and 4, but with the camera positioned so that the view of the object is seen through the upper right section of the finder frame, thereby indicating that the image will appear in relatively the same position on the exposure surface of the film or plate of the camera.

Adverting to the drawings in detail, the numeral 10 indicates a camera, and in this instance is shown as being of the folding type, although it is to be understood that my invention may be applied to a camera of any other type. In the camera I provide an open view-finder frame 11, made preferably of wire and having the same shape as the boundary lines 12 of the exposure surface of the film or plate of the camera, as shown in Fig. 4. The frame is in this instance shown as rectangular and having extended end portions 13, each of which is formed with an eye 14 so that the frame is adapted to be pivotally secured to a rod 15, which also is made of wire and has thereon an eye 16 at one end and a bend 17 at the other end for preventing the frame from slipping out of engagement with the rod. By means of the eye 16 the rod is in its turn pivotally secured upon a threaded stud 18, which is fastened on the inside of the front cover 19 of the camera and at one side edge thereof and is in parallelism with the plane of the cover so that the rod 15 with the frame 11 thereon may be swung close to the cover or to a plane at a right angle to the axis of the camera as is most clearly shown in Figs. 2 and 4. In the latter position the rod is held rigidly upon the stud by a nut 20, which is screwed onto the stud and engages the eye 16 of the rod.

A sight member 21, which has at one end a sight opening 22 therein, is at its other end by preference pivotally attached at some point on the camera back of the frame 11, preferably on the outside of the rear wall 23, as shown at 24 in Figs. 4 and 5, so that the sight member is adapted to be swung to a position where a line drawn through the center of the sight opening and the center of the frame opening is parallel with the axis of the camera (Fig. 2), and a stop 25 on the camera serves as means for limiting the swinging movement of the sight member to this position.

The frame 11 has also secured thereto cross-hairs or fine wires 26 and 27, crossing each other at the center of the frame opening. The dimensions of the frame are to the dimensions of the exposure surface of the film or plate of the camera, as the distance between the sight member and the frame, is to the distance between the exposure surface of the film or plate of the camera and the focus of the camera.

In practice, when the cover 19 has been swung open, the rod 15 and the frame 11 thereon are swung upward and then through an arc of 180 degrees to a plane at a right angle to the axis of the camera, the sight member 21 is swung down to the stop 25, and the direct view finder is ready for service. The operator then sights through the sight opening 22 in the sight member 21 and views the object, which he desires to photograph, through the frame 11. When, in his line of vision the center of the object thus coincides with the crossing point of the wires 26 and 27, as shown in Fig. 1, he snaps the camera, and the image of the object will then appear exactly in the center of the exposure surface of the film or plate of the camera. If the operator desires to have the object photographed in offset relation to the center, he simply tilts or positions the camera, until the object is seen through the frame in an offset relation thereof, as in Fig. 5, in which a bird is sighted through the upper right section of the finder frame. When the camera is snapped in this position, the image of the bird will appear in the corresponding upper right section of the exposure surface of the film or plate.

It is seen that, when the frame is again swung from the operative position and laid flat upon the cover, as shown in Fig. 3, and when the cover is closed, the frame 11 and the rod 15 are housed within the camera and thus protected from injury. In order to protect the sight member when the camera is not in use, the sight member is simply turned to a vertical position, as indicated by dot-and-dash lines in Fig. 4.

Having thus described my invention, I claim as new and desire to secure by Letters Patent of the United States the following:

1. In combination with a camera having a hinged front cover, a frame, crossed wires in said frame, a joint pivotally connecting a corner of said frame to a free edge of said cover at the inner side thereof, a leaf member having a peep hole formed at one end thereof and pivoted at its other end to the camera; said leaf member and said frame being adapted to be swung into alignment positioning said hole and the intersection of said wires in a line parallel to the axis of the camera, or to be retracted to a protected position when not in use.

2. In combination with a camera having a hinged front cover; a rod pivotally secured to the inside of the cover and at one side edge thereof so as to be swung close to the cover or to a position at right angles thereto; means for holding the rod in locked relation to the cover; a view finder comprising an open frame pivotally mounted on the rod and disposable to extend laterally from the camera in set relation thereto; wires secured to the frame and crossing each other substantially at the center of the frame opening; a sight member pivotally secured at one end to the back of the camera and provided with a sight opening at its other end; and stop means for limiting the pivotal movement of the sight member to position said sight opening in a line parallel to the axial line of the camera and passing through the point of intersection of said wires when said frame is in said set position.

In testimony whereof, I affix my signature.

THOMAS F. EASTMAN.